United States Patent [19]
Kubo et al.

[11] Patent Number: 5,764,838
[45] Date of Patent: Jun. 9, 1998

[54] ASPHERICAL LENS FOR OPTICAL FIBER AND OPTICALLY COUPLING CONSTRUCTION USING THE SAME

[75] Inventors: Junichi Kubo, Daito; Makoto Okada, Kameoka, both of Japan

[73] Assignee: Nippon Aspherical Lens Co., Ltd., Osaka-fu, Japan

[21] Appl. No.: 708,572

[22] Filed: Sep. 5, 1996

Related U.S. Application Data

[60] Provisional application No. 60/003,248 Sep. 5, 1995.
[51] Int. Cl.$^6$ .................................................. G02B 6/36
[52] U.S. Cl. ........................... 385/93; 385/33; 359/708
[58] Field of Search ..................... 385/88–94, 32–35; 359/708–719

[56] References Cited

U.S. PATENT DOCUMENTS

5,452,389  9/1995  Tonai et al. .......................... 385/93

*Primary Examiner*—Rodney B. Bovernick
*Assistant Examiner*—Hemang Sanghavi
*Attorney, Agent, or Firm*—Nikaido, Marmelstein, Murray & Oram LLP

[57] ABSTRACT

A construction in which a light emitting/receiving element and an optical fiber are optically coupled by a lens system formed by a biconvex aspherical lens. This lens is featured by: a first lens surface (R1) and a second lens surface (R2) both having a positive refracting power. At least one lens surface is formed by an aspherical surface. A distance L between the light emitting portion and the light receiving portion is 1.3129 mm<L<2.0129 mm. Lens thickness t at its center is 0.2147 mm<t<0.8822 mm; and 0.5<|f/φ|<2.2632 where f=focal length of the lens, and φ=incident pupil diameter.

6 Claims, 6 Drawing Sheets

RANGE OF SAG VALUE Z' (Z1', Z2')

FIG.7

LENS THICKNESS AT ITS CENTER

FIG.8

| DIAMETER OF OPTICAL FIBER | ⌀ 200μm | ⌀ 100μm | ⌀ 62.5μm | ⌀ 50μm |
|---|---|---|---|---|
| PRIOR ART | 3.4560E-05 | 1.3051E-05 | 5.2950E-06 | 3.4217E-06 |
|  | 100.0% | 100.0% | 100.0% | 100.0% |
| THE FIRST EMBODIMENT | 4.0702E-05 | 1.4666E-05 | 5.6893-06 | 3.6727E-06 |
| COMPARED TO PRIOR ART | 117.8% | 112.4% | 107.4% | 107.3% |
| THE SECOND EMBODIMENT | 4.0439E-05 | 1.5786E-05 | 6.2068E-06 | 3.9396E-06 |
| COMPARED TO PRIOR ART | 117.0% | 121.0% | 117.2% | 151.1% |
| THE THIRD EMBODIMENT | 3.7004E-05 | 1.601DE-05 | 6.2474E-06 | 3.9943E-06 |
| COMPARED TO PRIOR ART | 107.1% | 122.7% | 118.0% | 116.7% |

UNIT: WATTS

BRIGHTNESS - CHARACTERISTIC OF RADIATION

FIG.10

|  | PRIOR ART | FIRST EMBODIMENT | SECOND EMBODIMENT |
|---|---|---|---|
| CENTER OF IMAGE SURFACE | 100.0 | 100.0 | 100.0 |
| PERIPHERAL EXTREMITY OF IMAGE SURFACE | 67.8 | 98.9 | 93.3 |

FIG.11

|  | NAO (OBJECT SIDE NA) | θ (DEG) | NA (IMAGE SIDE NA) | θ' (DEG) |
|---|---|---|---|---|
| PRIOR ART | 0.6970 | 23.3343 | 0.2436 | 14.1006 |
| FIRST EMBODIMENT | 0.6000 | 36.8699 | 0.2082 | 12.0140 |
| SECOND EMBODIMENT | 0.6000 | 36.8699 | 0.2305 | 13.3275 |

ASPHERICAL LENS FOR OPTICAL FIBER AND OPTICALLY COUPLING CONSTRUCTION USING THE SAME

This application claims the benefit of provisional application number 60/003,248 filed on Sep. 5, 1995.

FIELD OF THE INVENTION

This invention relates to an aspherical lens for an optical fiber. More specifically, the invention relates to an aspherical lens for an optical fiber for optically coupling a light emitting/receiving element, such as a light emitting diode or phototransistor to an optical fiber.

BACKGROUND OF THE INVENTION

When performing data transmission by means of an optical fiber, it is required that a light emitting/receiving element for converting electric signal to optical signal, or vice versa, i.e., a light emitting element such as a light emitting diode or a light receiving element such as a photodiode be efficiently coupled to the optical fiber.

Figure 13:
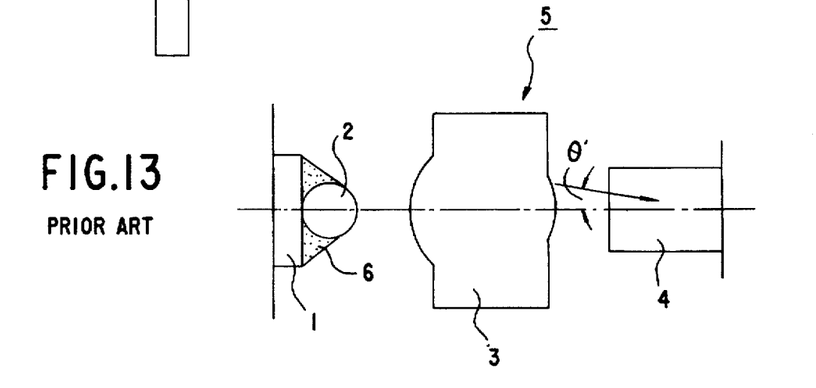
FIG. 13 shows the optically coupling construction of the prior art using a spherical lens.

FIG. 13 shows an optically coupling construction according to prior art.

In FIG. 13, reference numeral 1 designates a light emitting diode. The light emitting diode is fixedly mounted on a header fixed to one end of a housing (not shown). Reference numeral 2 designates a spherical lens attached to a light emitting portion of the light emitting diode in optically alignment therewith. Reference numeral 3 designates a biconvex spherical lens disposed within the housing. Reference numeral 4 designates an optical fiber inserted into the housing.

In the above construction, light from the light emitting diode 1 is condensed by the spherical lens 2 and the biconvex spherical lens 3 and directed onto the end surface of the optical fiber 4. The spherical lens 2 is provided, since, when the biconvex spherical lens 3 is solely used, it is not possible to reduce angle θ' at the outgoing or ejection side, so that incident efficiency to the optical fiber 4 is decreased.

Figure 14:
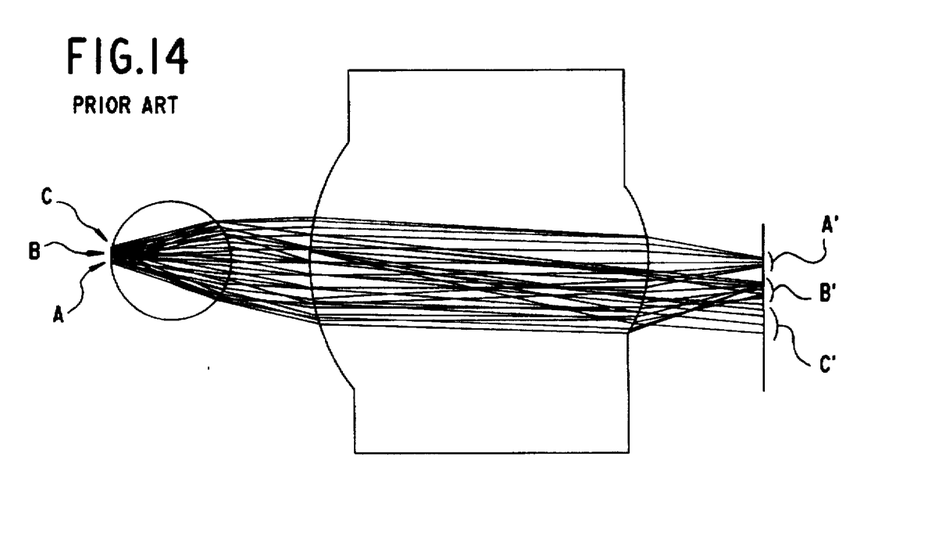
FIG. 14 shows an optical path of the prior art using a spherical lens.

Optical path of the optical system according to prior art is shown in FIG. 14.

The above-mentioned optically coupling construction 5 requires the spherical lens 2. Thus, assembling cost is undesirably increased. That is to say, bonding the optical axis of the spherical lens 2 to the small light emitting portion of the light emitting diode 1 in alignment therewith is a very time-consuming operation. Thus, it is difficult to obtain high mechanical precision.

Optical performance obtained from the prior art optically coupling construction 5 will be explained below.

Figure 9A:
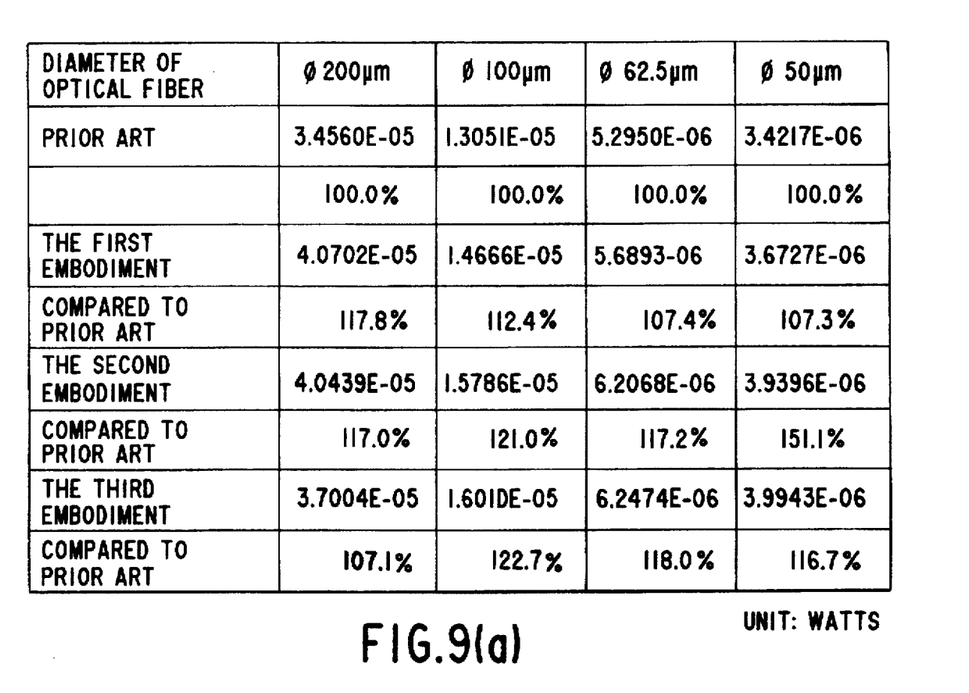
FIGS. 9a–b show quantity of radiant energy to be received by optical fibers of different diameters in the optically coupling construction, with respect to the prior art, and the first and second embodiments of the invention.
Figure 9B:
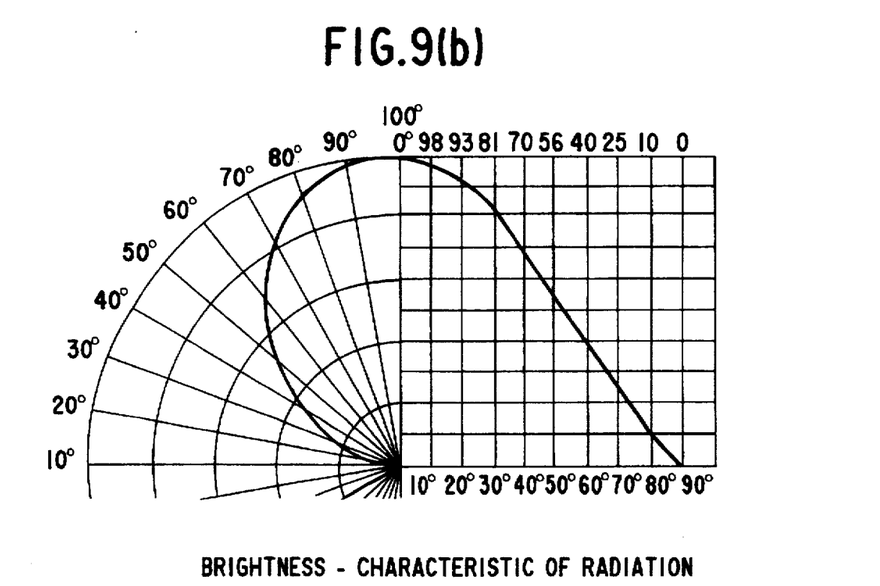

FIG. 9 shows quantity of radiant energy (Watts) to be received by optical fibers having different diameters (50–200 micrometers), when the light emitting element I emits light with a common radiation characteristic shown in the bottom of FIG. 9. In the left of the drawing, values to be obtained by the prior art construction 5 are shown. The values of the prior art include tolerance due to mispositioning during manual operation for bonding the spherical lens 2 (−15% is reduced as compared when no mispositioning occurs).

Figure 10:
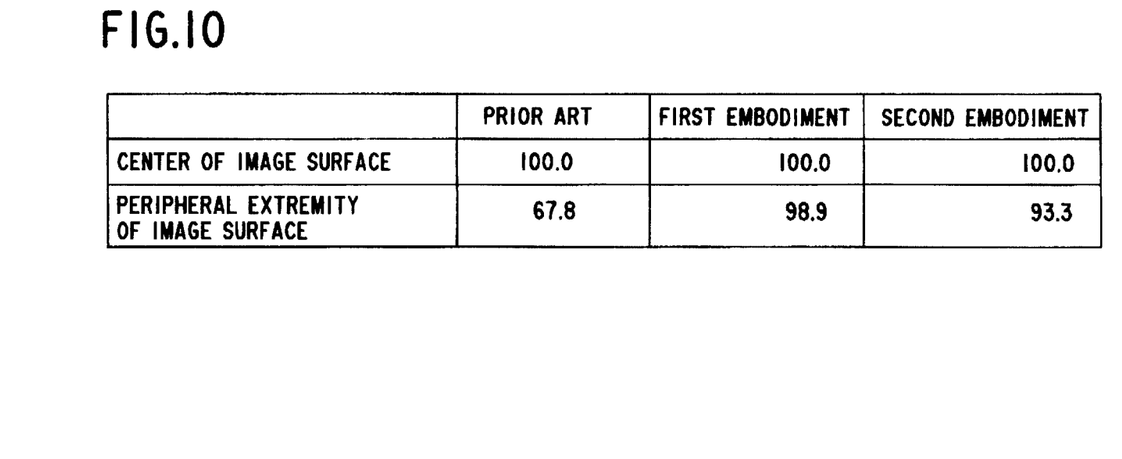
FIG. 10 shows a quantify of marginal light of the invention, as compared with the optically coupling construction in the prior art.

The ratio of quantity of marginal light to quantity of light at the center of image surface (assuming to be 100%) in prior art construction 5 is shown in left column of FIG. 10.

In the prior art construction, the quantity of marginal light is reduced relative to the center of the image surface, since illumination intensity of the image surface is reduced in proportion to $\cos^4\omega$ ($\omega$ is an incidence angle relative to the optical axis). Reduction in the quantity of marginal light due to aberration of distortion is also involved.

SUMMARY OF THE INVENTION

In order to solve the problem experienced in using the above-mentioned spherical lens 2, the present invention is aimed at provision of a biconvex aspherical lens which is capable, as a single lens, of performing the functions of the above-mentioned spherical lens 2 and the biconvex spherical lens 3. The invention is also aimed at provision of an optically coupling construction having an optical characteristic comparable or superior to that of the optically coupling construction 5 utilizing the spherical lens 2 according to the prior art.

Figure 1:
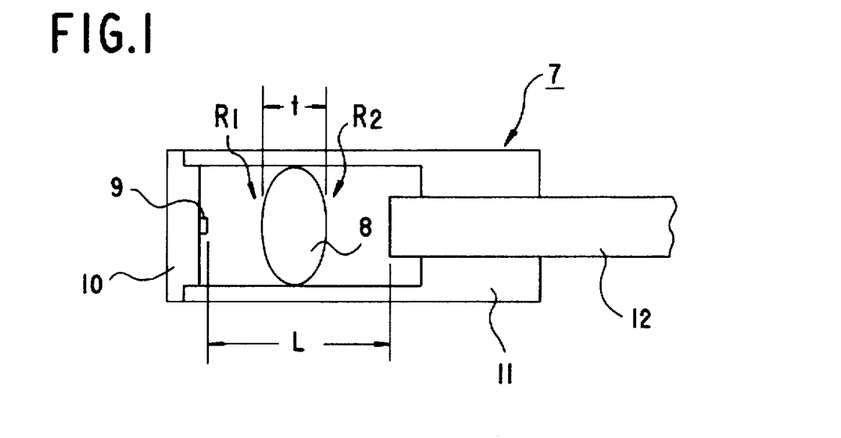
FIG. 1 shows one example of an optically coupling construction using an aspherical lens for an optical fiber according to the invention.

The present invention provides a single lens 8 to be used for example in an optically coupling construction 7 shown in FIG. 1. Characteristics of the single lens will be explained below.

Figure 2:
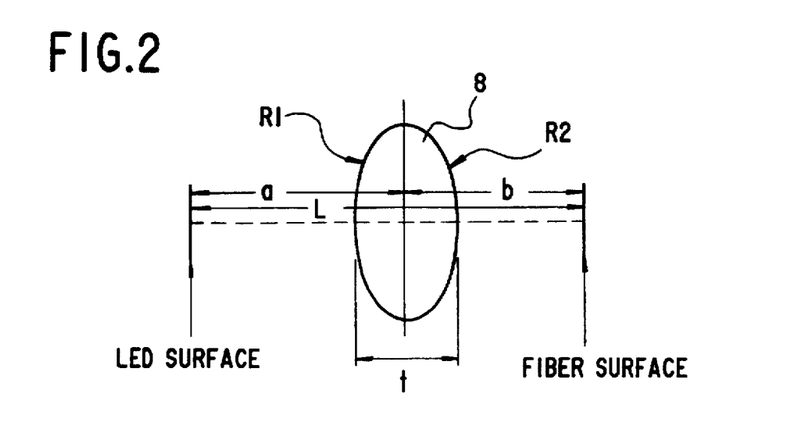
FIG. 2 shows definition of a first lens surface, a second lens surface and lens thickness t at its center of the aspherical lens for an optical fiber according to the invention.

In the following description, a distance between the light emitting/receiving element and the optical fiber is expressed by "L". The single lens 8 is expressed, as shown in FIG. 2, to have a first lens surface "R1" facing to the light emitting/receiving element, a second lens surface "R2" facing to the optical fiber, and a lens thickness at the center "t" (a thickness of the lens at its center). The first lens surface has an effective diameter "Φ1" and the second lens surface has an effective diameter "Φ2".

(1) In the aspherical lens for an optical fiber optically coupling a light emitting portion and a light receiving portion according to the invention, the first lens surface "R1" and the second lens surface "R2" both have a positive refracting power, and at least one of the first and second lens surfaces is formed by an aspherical surface;

the distance L between the light emitting portion and the light receiving portion is defined by 1.3129 mm<L<2.0129 mm; and the lens thickness t is defined by 0.2147 mm<t<0.8822 mm.

The aspherical lens according to the invention is further specified by one of the following three conditions (A) to (C).

(A) $0.5 < |f/\phi| < 2.2632$ (f is a focal length of the lens, and $\phi$ is an incident pupil diameter).

(B) the ratio of a sag value Z (at the position of the effecive diameter Φ) relative to an effective diameter Φ in each of the first lens surface R1 (having an effective diameter Φ1 and a sag value Z1) and the second lens surface R2 (having an effective diameter Φ2 and a sag value Z2) is defined by:

$$5 < Z1/\Phi1 < 15 \ (\%) \quad (1)$$

$$25 < Z2/\Phi2 < 35 \ (\%) \quad (2)$$

(C) the sag value Z1 at the effective diameter Φ1 of the first lens surface R1 and the sag value Z2 at the effective diameter Φ2 of the second lens surface R2, relative to the lens thickness at the center t are defined by:

$$Z1 = -0.0491\ t + 0.0564 \ (\text{mm}) \quad (3)$$

$$\Phi1 = -0.7469\ t + 0.7161 \ (\text{mm}) \quad (4)$$

$$Z2 = -0.0011\ t - 0.1686 \ (\text{mm}) \quad (5)$$

$$\Phi2 = -0.0781\ t + 0.6019 \ (\text{mm}) \quad (6)$$

In actual manufacturing, a certain range of dimensional tolerance is permitted to the above values, so as to obtain an intended optical characteristic.

Specifically, the maximum allowable value ±Z1' relative to the sag value Z1, and the maximum allowable value ±Z2' relative to the sag value Z2 are defined, with respect to the lens thickness at the center t, by:

$$Z1'=0.0326\ t-0.00136\ (\text{mm}) \quad (7)$$

$$Z2'=0.0106\ t+0.0115\ (\text{mm}) \quad (8)$$

The allowable value Φ1' in increase relative to the effective diameter Φ1 and the allowable value Φ2' in increase relative to the effective diameter Φ2 are defined by:

$$\Phi1'=\Phi2'=+0.05\ (\text{mm}) \quad (9)$$

The basis for determining the above additional conditions (A), (B) and (C) will be explained below.

The above conditions are determined so as to obtain an optical characteristic (an amount of radiant energy (Watts)) to be received by the optical fiber shown in FIG. 9) comparable or superior to that of the optically coupling construction 5 in prior art shown in FIG. 13, within the range of the distance L between the light emitting/receiving element and the optical fiber and the lens thickness at the center t.

The upper limit 2.2632 in 0.5<lf/φl<2.2632 of the condition (A) is a brightness of the system relative to the object at infinity (infinite F-number) in the prior art optically coupling construction. It is true that manufacturing cost may be reduced by eliminating the spherical lens 2. It is noted, however, that a lens having an optical characteristic (photoconductivity) less than that of the prior art cannot be practically used. The value 0.5 is a theoretical lower limit. It is found that a lens having an optical characteristic close to the above-mentioned lower limit may be manufactured.

Figure 3:
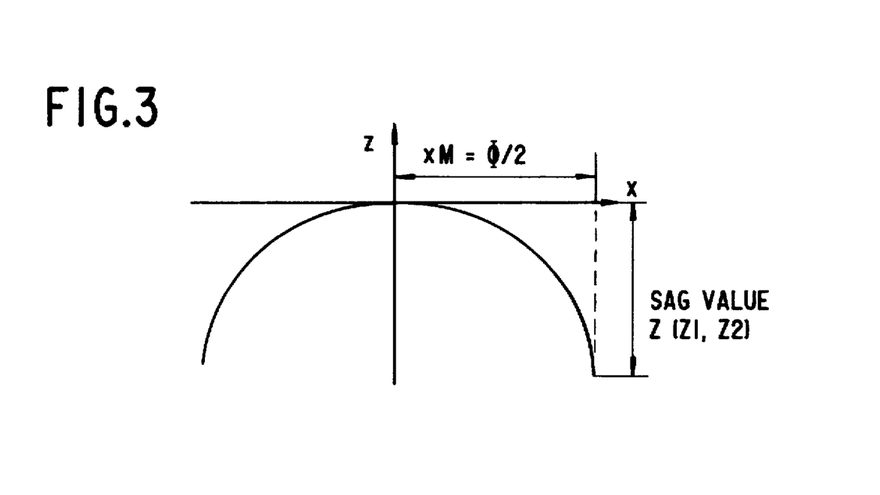
FIG. 3 illustrates a sag value in the aspherical lens according to the invention.

Equations (1) and (2) regarding the condition (B) are provided in terms of a sag value, so as to obtain an optical characteristic comparable or superior to that of the prior art. As shown in FIG. 3, the sag value is a deviation in the direction of the optical axis from the lens vertex to the position of the effective diameter Φ (the distance XM from the center is a half value of the effective diameter. The direction in which R is decreased relative to the base R of the lens surface is given the sign of "+", while the direction in which R is increased is given the sign of "−" (this is applied equally in the following description).

As far as the above equations (1) and (2) are satisfied, a lens having an optical characteristic (an amount of radiant energy (Watts) to be received by the optical fiber) comparable or superior to that of the prior art lens shown in FIG. 9 may be manufactured.

Figure 4:
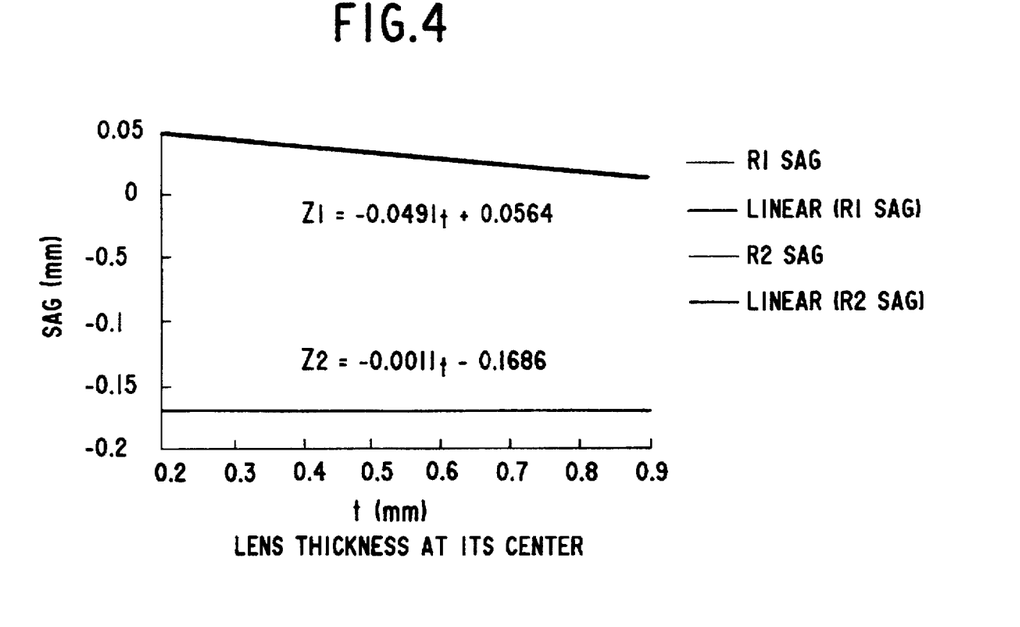
FIG. 4 is a graph showing a range of the value as a relationship between the lens thickness t at its center and the sag value Z.
Figure 5:
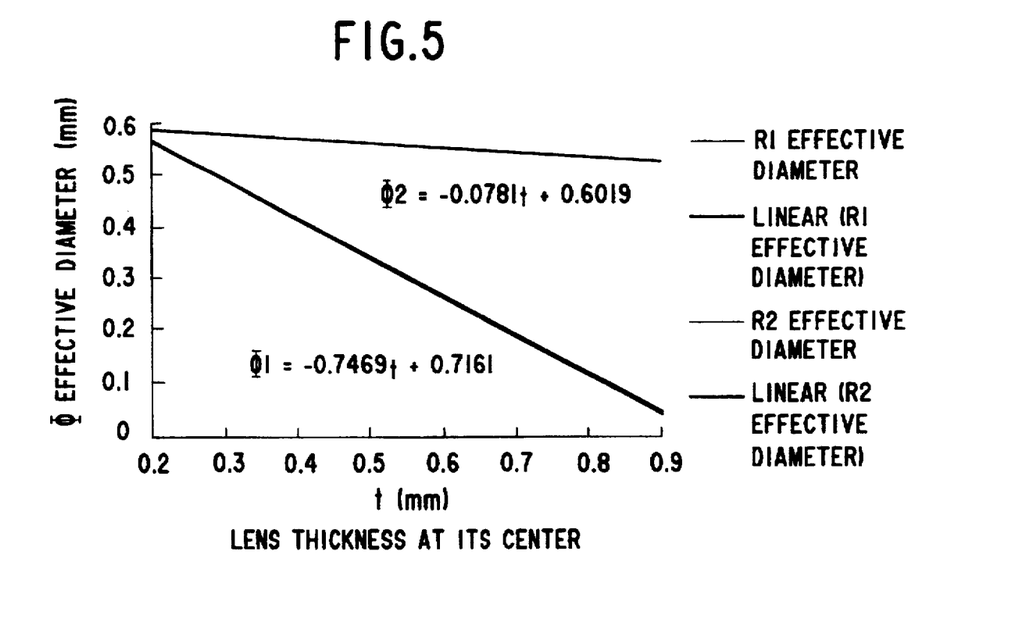
FIG. 5 is a graph showing a range of the value as a relationship between the lens thickness t at its center and effective diameter Φ.
Figure 7:
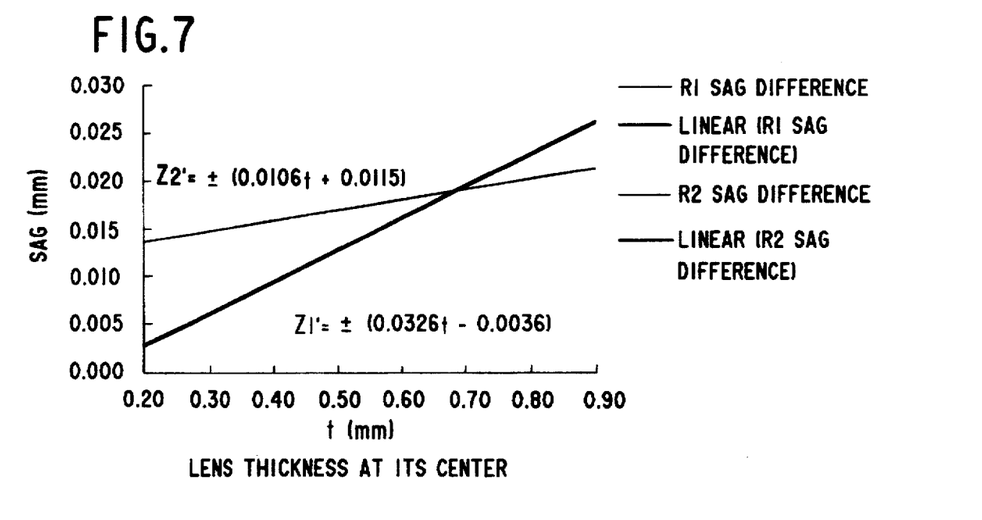
FIG. 7 is a graph showing a relationship between the allowable range Z' of the sag value and the lens thickness at its center.

Equations (2) through (9) in the condition (C) is provided in terms of a sag value Z in relation to a lens thickness at the center. This condition may be graphically indicated by FIGS. 4, 5 and 7.

Figure 6:
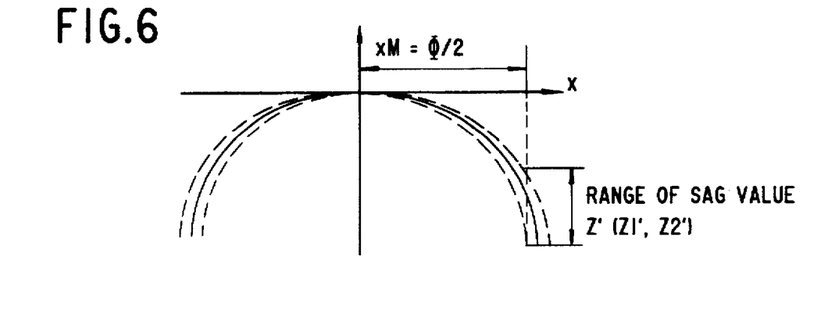
FIG. 6 shows an allowable range Z' of the sag value.

Effective diameters Φ1 and Φ2 and sag values Z1 and Z2 are related to the lens thickness at the center t, as indicated by equations (3) to (6). Thus, predetermined effective diameters Φ1 and Φ2 and sag values Z1 and Z2 may be determined, when the lens thickness at the center is determined. The tolerances or allowable ranges ±Z1 and ±Z2 indicate that a lens may be manufactured by changing or shifting the lens surface to the dotted lines, as shown in FIG. 6. The tolerances may be indicated by a length in the direction of the optical axis at the position of the effective diameter Φ. This condition is determined so as to obtain a lens having an optical characteristic comparable or superior to that of the prior art lens shown in FIG. 9.

(3) The aspherical lens for an optical fiber may be manufactured using a transparent material having a predetermined refractive index. In order to provide for high reliability of the lens, regardless of significant changes in working environment, the lens is sometimes required to withstand a temperature of −40 to −80 degree Celsius and to have a chemical resistance. Materials satisfying such requirements include, for example, polycarbonate, PMMA (polymethylmethacrylate), polyetherimide and glass. Polyetherimide and glass are preferable, since they are superior in terms of the above-mentioned properties.

(4) As shown in FIG. 1, only a single aspherical lens for an optical fiber may be disposed between the light emitting/receiving element and the optical fiber, so as to form an optically coupling construction.

(5) In the construction for disposing a lens at a location close to a light emitting/receiving element, without causing prevention from a bonding wire, an end surface of the bonding wire is bonded to a bonding pad of a semiconductor chip fixedly mounted on a header in which a lead wire is embedded. The wire is extended along the surface of the header and bonded to the forward end of the lead wire. Thus, the semiconductor chip and the forward end of the lead wire are electrically connected together. The forward end of a support portion for a single lens mounted on a housing is inclined toward a light emitting portion of the semiconductor chip. The single lens is supported by the forward end thereof.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE PREFERRED EMBODIMENTS

In FIG. 1 showing one embodiment of the invention, reference numeral 9 designates a light emitting diode, as a light emitting/receiving element, fixedly mounted on a header 10, 11 designates a housing, and 12 designates an optical fiber. The single lens 8 is fixedly positioned within the housing 11. The header 10 is fixedly positioned in one opening of the housing 11. The optical fiber 12 is fixedly inserted in the other opening of the housing.

It is noted that the light emitting/receiving element 9 is meant to use a light emitting element such as a light emitting diode, or a light receiving element such as a phototransistor. The optically coupling construction 7 may be used as an optical signal sending side or an optical signal receiving side.

Figure 8:
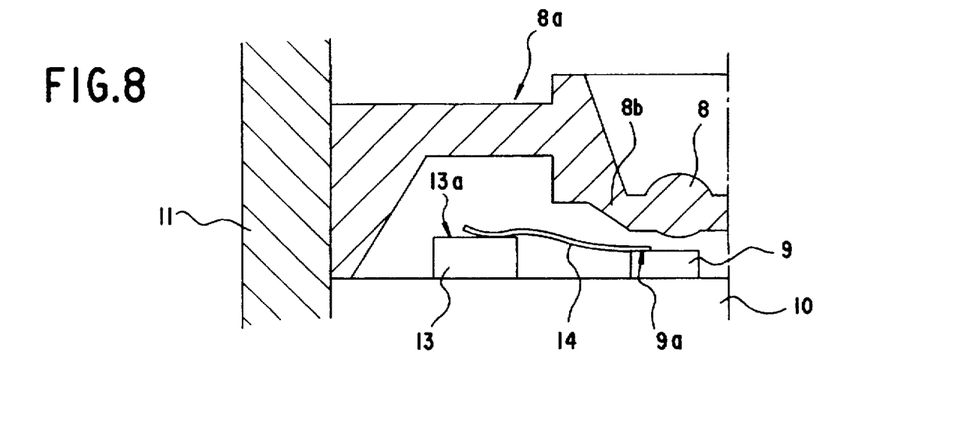
FIG. 8 is a cross-sectional view of a wire bonding construction.

The light emitting/receiving element 9 has a construction, for example, as shown in FIG. 8. The light emitting/receiving element is electrically connected to a lead wire 13 embedded in a header 10.

The header 10 shown in FIG. 8 is mounted on one end of a housing 11, as shown in FIG. 1. A semiconductor chip, serving as the light emitting/receiving element 9, is fixedly mounted on the header 10. The lead wire 13 is embedded in the header at a position adjacent to the semiconductor chip. In the connecting construction, an end surface of a bonding wire 14 is bonded to a bonding pad 9a of the semiconductor chip 9. The lead wire 13 is extended horizontally along the surface of the header 10. The lead wire is connected to a protruding end 13a of the header. Thus, it is capable for minimizing a length of the bonding wire 14 which extends in the upward direction.

A support portion 8a of a single lens 8 is attached to the housing 11. The forward end 8b of the support portion is extended at an angle toward the light emitting portion of the semiconductor chip 9. The single lens 8 is supported by the support portion at its forward end. In the construction shown in FIG. 8, the single lens 8 and the support portion 8a therefor are integrally formed. Due to the fact that the forward end 8b is inclined, the bonding wire 14 is prevented from contacting with the single lens 8 and the support portion 8a, even when the bonding wire 14 is extended toward the protruding end 13a of the lead wire 13 which is located above the bonding pad 9a.

First, second and third embodiments will be explained below as design examples of an aspherical lens 8 for an optical fiber which satisfy the above-mentioned conditions.

In these examples, lens configurations are determined by substituting each design value into the following aspherical equation, wherein x is a distance spaced away from the lens center in the direction perpendicular to the optical axis, and Z is an amount of sag (a length spaced from the lens vertex in the direction of the optical axis).

Aspherical Equation:

$$Z = \frac{\frac{x^2}{R}}{1 + \sqrt{1 - (1+k)\left(\frac{x}{R}\right)^2}} + \sum_{n=1}^{20} A_n |x^n|$$

1. lens configuration according to the first embodiment
Configuration of R1 (in mm):
R = 0.44899         k = −11.905791
A4 = −0.957377      A6 = 0.24199E+1
A8 = 0.0            A10 = 0.0
configuration of R2:
R = −0.24768        k = −1.080029
A4 = −0.500205      A6 = 0.0
A8 = 0.0            A10 = 0.0
thickness at the lens center:
t = 0.28 mm
focal length:
f = 0.2953 mm
infinite F-number:
0.7356

2. lens configuration according to the second embodiment
Configuration of R1:
R = 0.170           k = −13.17131
A4 = 0.0            A6 = 0.0
A8 = 0.0            A10 = 0.0
configuration of R2:
R = −0.224          k = 1.001121
A4 = −0.431624      A6 = 0.0
A8 = 0.0            A10 = 0.0
thickness at the lens center:
t = 0.6 mm
focal length:
f = 0.3721 mm
infinite F-number:
1.9831

3. lens configuration according to the third embodiment
Configuration of R1:
R = 0.4562          k = −16.5
A4 = 0.0            A6 = 0.0
A8 = 0.0            A10 = 0.0
configuration of R2:
R = −0.23445        k = −0.99
A4 = 0.40           A6 = 0.0
A8 = 0.0            A10 = 0.0
thickness at the lens center:
t = 0.45 mm
focal length:
f = 0.3239 mm
infinite F-number:
1.0838

When a lens configuration is determined by the above values and the aspherical equation, the focal length f of the lens may be determined by the thickness at the lens center t and the lens material.

Then, the lens positions (distance "a" between LED and R1 and distance "b" between R2 and optical fiber) within the housing and the magnification β may be determined by the following optical equation:

$a+b=L$ ($L=1.6129$ mm)

$\beta=b/a$ ($\beta$ is the magnification)

$1/a+1/b$ 32 $1/f$ ($f$ is the focal length)

Since NA of the optical fiber is known, the aperture at the object side (NAO) may be determined by the following optical equation:

$\beta=NAO/NA$

A lens according to the above embodiment is incorporated in an optically coupling construction 7 shown in FIG. 1, in which a length L between the light emitting/receiving element and an optical fiber is 1.6129 mm, whereby the below-mentioned optical characteristic may be obtained. It is noted that the following data are obtained when light emitting diodes having the same optical characteristic are used as a light emitting/receiving element 9.

Quantity of optical energy to be transmitted is shown in FIGS. 9(a)–9(b), in comparison with the prior art. In the first and second embodiments, the amount of radiant energy to be received by the fibers having a different diameter is great as compared with the prior art. It will be understood from FIGS. 9(a)–9(b) that there is a certain range of allowable value, as already mentioned with regard to the design of the aspherical lens for an optical fiber of the invention.

The quantity of marginal light is shown in FIG. 10. As shown in FIG. 10, the ratio of the quantity of marginal light to that of the center of the image surface is large when compared with the prior art. This indicates that the aspherical lens of the invention eliminates adverse effect of aberration of distortion and provides a brighter lens.

Figure 11:
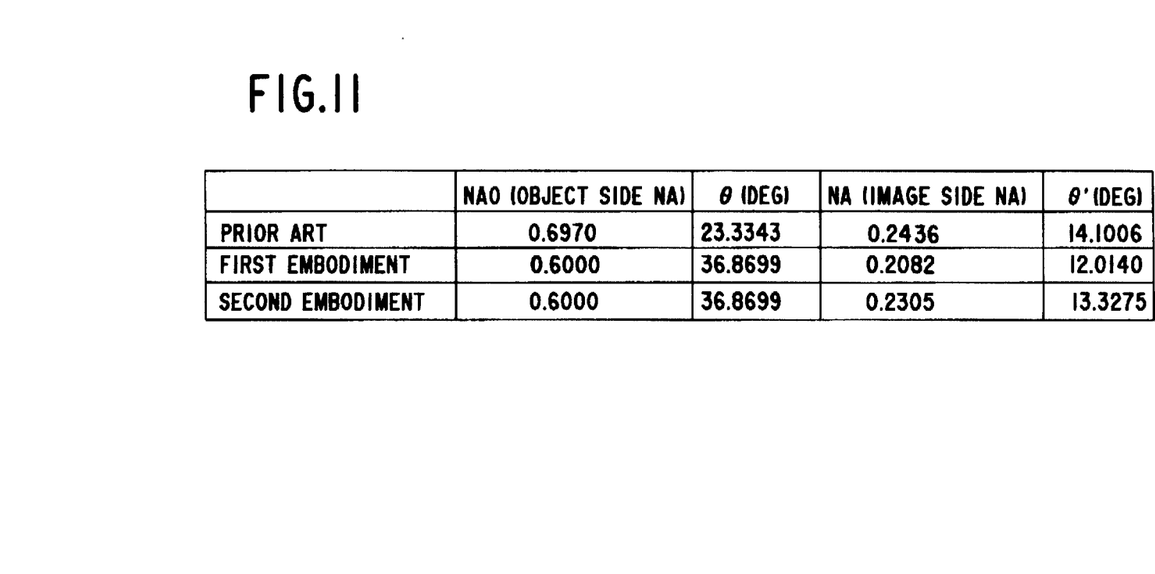
FIG. 11 shows numerical apertures NA and outgoing angles θ, θ' according to the first and second embodiments of the invention, as compared with the prior art shown in FIG. 12.
Figure 12:
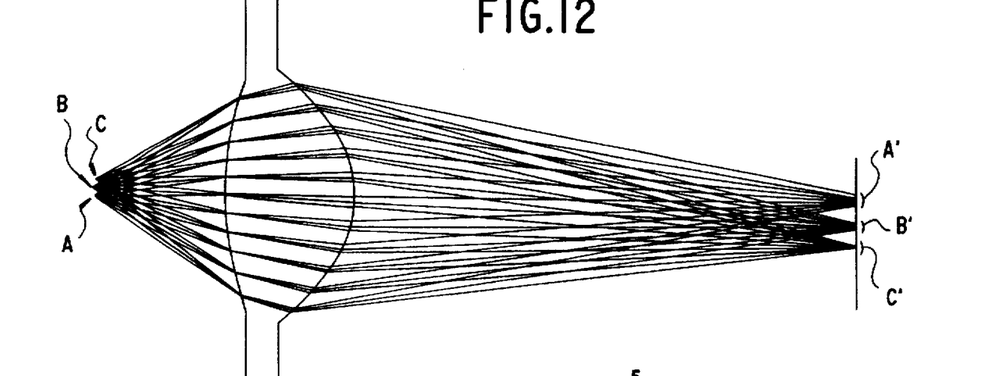
FIG. 12 shows an optical path of the aspherical lens for an optical fiber according to the first embodiment of the invention.

Numerical apertures NA and outgoing angles θ, θ' according to the first and second embodiments are shown in FIG. 11, as compared with those of the prior art shown in FIG. 12.

In order to increase incidence efficiency, it is required that NA of the image side be larger than that of the optical fiber. NA of the optical fiber varies depending upon its diameter. For example, when an optical fiber has 50 micrometers diameter, NA is 0.18, and when an optical fiber has 200 micrometers diameter, NA is 0.37. The above-mentioned optically coupling construction 5 are desirably adapted so that optical fibers having different diameters may be replaced. In order to make use of an optical fiber of a reduced diameter, it is preferable that the above-mentioned NA be made as small as possible. From this point of view, the first and second embodiments both represent increased value as compared with the prior art. It is noted that the outgoing angle θ' of the image point has the same meaning as the numerical aperture NA.

In order to illustrate condensing characteristics of the aspherical lens for an optical fiber according to the invention, optical paths are shown in FIG. 12 in which three light emitting points (point A, point B and point C), directed radially from the optical axis toward the periphery of the aspheric lens according to the first embodiment, are introduced to the image side (points A', B' and C').

It will be appreciated that, light scattering is reduced in FIG. 12, while, scattering of the marginal light (C) is increased in the optical path shown in FIG. 14 due to the effect of spherical aberration.

In addition to a light emitting diode, a laser diode may also be used as a light emitting element in the invention.

The aspherical lens for an optical fiber according to the invention employs a single lens, contrary to the prior art lens system in which a spherical lens and an aspherical lens are combined. Thus, error in mechanical performance may be reduced. It is also noted that manufacturing process is simplified, so that production cost may be reduced.

The aspherical lens for an optical fiber according to the invention obviates a process for adhesively fixing the spherical lens to a semiconductor chip as in the prior art. Thus, assembling work is simplified.

It will further be obvious to those skilled in the art that many variations may be made in the above embodiments, here chosen for the purpose of illustrating the present invention, and full result may be had to the doctrine of equivalents without departing from the scope of the present invention, as defined by the appended claims.

We claim:

1. An aspherical lens for an optical fiber comprising a single lens for optically coupling a light emitting portion and a light receiving portion:

a first lens surface and a second lens surface both having a positive refracting power, at least one lens surface being formed by an aspherical surface;

a distance L between the light emitting portion and the light receiving portion being 1.3129 mm<L<2.0129 mm;

lens thickness t at its center being 0.2147 mm<t<0.8822 mm; and $0.5<|f/\phi|<2.2632$ f=focal length of the lens, $\phi$=incident pupil diameter.

2. An aspherical lens for an optical fiber comprising a single lens for optically coupling a light emitting portion and a light receiving portion;

a first lens surface and a second lens surface both having a positive refracting power, at least one lens surface being formed by an aspherical surface;

a distance L between the light emitting portion and the light receiving portion being 1.3129 mm<L<2.0129 mm;

lens thickness t at its center being 0.2147 mm<t<0.8822 mm;

the ratio of sag value Z1 to the effective diameter $\phi 1$ of the first lens surface, and the ratio of sag value Z2 to the effective diameter $\phi 2$ of the second lens surface being expressed respectively by $5<(Z1/\phi 1)<15\%$ and
$25<(Z2/\phi 2)<35\%$.

3. An aspherical lens for an optical fiber comprising a single lens for optically coupling a light emitting portion and a light receiving portion:

a first lens surface and a second lens surface both having a positive refracting power, at least one lens surface being formed by an aspherical surface;

a distance L between the light emitting portion and the light receiving portion being 1.3129 mm<L<2.0129 mm;

lens thickness t at its center being 0.2147 mm<t<0.8822 mm; and the lens having a spherical or aspherical surface in which the sag value Z1 at the position of the effective diameter $\phi 1$ of the first lens surface and the sag value Z2 at the position of the effective diameter $\phi 2$ of the second lens surface, relative to the lens thickness at the center t are defined by:

Z1=−0.0491 t+0.0564 mm
$\phi 1$=−0.7469 t+0.7161 mm
Z2=−0.001 t−0.1686 mm
$\phi 2$=−0.0781 t+0.6019 mm.

4. A single lens according to claim 3 wherein:

the maximum allowable value ±Z1' relative to the sag value Z1, and the maximum allowable value ±Z2' relative to the sag value Z2 are defined, with respect to the lens thickness at the center t, by:

Z1'=0.0326 t−0.00136 mm
Z2'=0.0106 t+0.0115 mm; and the allowable value Φ1' in increase relative to the effective diameter Φ1 and the allowable value Φ2' in increase relative to the effective diameter Φ2 are defined by:
Φ1'=Φ2'=+0.05 mm.

5. An aspherical lens for an optical fiber according to any one of claims 1 to 4 wherein the lens is formed from polycarbonate. PMMA (polymethylmethacrylate), polyetherimide or glass.

6. An optically coupling construction wherein the light emitting portion and the light receiving portion are a light emitting/receiving element and an optical fiber, respectively, and wherein a single aspherical lens for an optical fiber according to any one of claims 1 to 4 is disposed between the light emitting/receiving element and the optical fiber.

* * * * *